United States Patent [19]

Halim

[11] Patent Number: 4,589,612

[45] Date of Patent: May 20, 1986

[54] HIGH-DENSITY ACCOMMODATIONS SYSTEM UTILIZING CONVERTIBILITY FROM PARALLEL BEDDING TO VERTICALLY STAGGERED SEATING

[76] Inventor: Wibara Halim, Kebraon 59, Sepanjang, Surabaya 60222, Indonesia

[21] Appl. No.: 640,461

[22] Filed: Aug. 13, 1984

[51] Int. Cl.⁴ .................. B64D 11/06; A47C 19/20
[52] U.S. Cl. ................................. 244/118.6; 5/9 R; 5/9 B; 5/118; 105/316
[58] Field of Search .............. 244/118.6; 105/314, 105/315, 316, 321, 322, 326; 5/8, 9 R, 9 B, 118; 296/69

[56] References Cited

U.S. PATENT DOCUMENTS

| | | | |
|---|---|---|---|
| 1,036,038 | 8/1912 | Vosler | 105/315 |
| 2,124,003 | 7/1938 | McDonnell, Jr. et al. | 244/118.6 |
| 2,608,366 | 8/1952 | Jergenson | 244/118.6 |
| 2,884,873 | 5/1959 | Candlin, Jr. | 105/315 |
| 4,071,210 | 1/1978 | Mutke | 244/118.6 |

Primary Examiner—Trygve M. Blix
Assistant Examiner—Rodney Corl
Attorney, Agent, or Firm—Bruce L. Birchard

[57] ABSTRACT

The present invention first provides a high-density accommodations module which is vertically convertible from parallel bedding to staggered-seating configurations. The respective configurations are more specifically established by at least one set of vertically-paired, reconfigurable accommodations compartments, each having in each of its associated configurations an upper-torso section and a lower-torso section. In the bedding configuration, prone postures are accommodated by a mutually-horizontal disposition of associated upper and lower-torso sections. In the seating configuration, upright postures are accommodated by a mutually-vertical disposition of the associated sections. For the conversion from bedding to seating, the module is arranged such that the lower-torso section of the upper compartment's bedding configuration becomes an upper-torso section for the lower compartment's seating configuration. In a companion manner the upper-torso section for each compartment's bedding configuration becomes a lower-torso section for the convertibly-associated seating configuration. Given this modular, high-density convertibility, the invention then further provides a high-load-factor transportation system in which a transportation vehicle carries a multitude of the subject accommodations modules so that both upright-seating and prone-bedding postures are available to each module-accommodated passenger.

7 Claims, 5 Drawing Figures

HIGH-DENSITY ACCOMMODATIONS SYSTEM UTILIZING CONVERTIBILITY FROM PARALLEL BEDDING TO VERTICALLY STAGGERED SEATING

BACKGROUND OF THE INVENTION

1. Field of the Invention

The invention relates in general to accommodations systems and relates in particular to a high-density accommodations module convertible between bedding and seating configurations.

2. The Prior Art

The present invention has been motivated by the observation that conventional accommodations systems, such as those on-board passenger aircraft, typically suffer from the dual drawbacks of inefficient utilization of available accommodations volume and an inability to cost-effectively provide comfortable bedding arrangements in combination with seating capabilities.

Passengers on board commercial aircraft are thus typically restricted to attempting to sleep in positions which are either essentially upright or only partially reclining at best. It is furthermore apparent that the restricted payload capabilities of such aircraft, in combination with the open-inefficient bedding-seating structures of the prior art have precluded the use of volume-intensive systems which could otherwise theoretically provide for truly-restful sleeping postures while allowing for upright seating orientations.

It is, accordingly, a first object of the present invention to overcome the disadvantages of the prior art.

It is a further object of the present invention to provide, for transportation vehicles such as airplanes, an improved high-density accommodations system with convertible bedding and seating capability.

SUMMARY OF THE INVENTION

The drawbacks of the prior art are overcome by the present invention which first provides a high-density accommodations module which is vertically convertible from parallel-bedding to staggered-seating configurations. The respective configurations are more specifically established by at least one set of vertically-paired, reconfigurable accommodations compartments, each having in each of its associated configurations an upper-torso section and a lower-torso section. In the bedding configuration, prone postures are accommodated by a in-line horizontal disposition of associated upper and lower-torso sections. In the seating configuration, upright postures are achieved by a vertical disposition of the upper torso sections. For the conversion from bedding to seating, the module is constructed so that the lower-torso section of the upper compartment's bedding configuration becomes the back-rest or upper-torso section for the lower compartment's seating configuration. In a companion manner the upper-torso section for each compartment's bedding configuration becomes the seat or lower-torso section for the associated seating configuration.

Given this modular, high-density convertibility, the invention then further provides a high-load-factor transportation system in which the space within the transportation vehicle is maximally utilized by the subject accommodations modules and both upright-seating and prone-bedding postures are available to each passenger.

BRIEF DESCRIPTION OF THE DRAWINGS

The present invention, as to its construction and operation, may be best understood by reading the description which follows in conjunction with the accompanying drawings, in which.

DETAILED DESCRIPTION OF THE PREFERRED EMBODIMENTS

I. Example Mechanizations

A. Accommodations Module

Figure 1A:
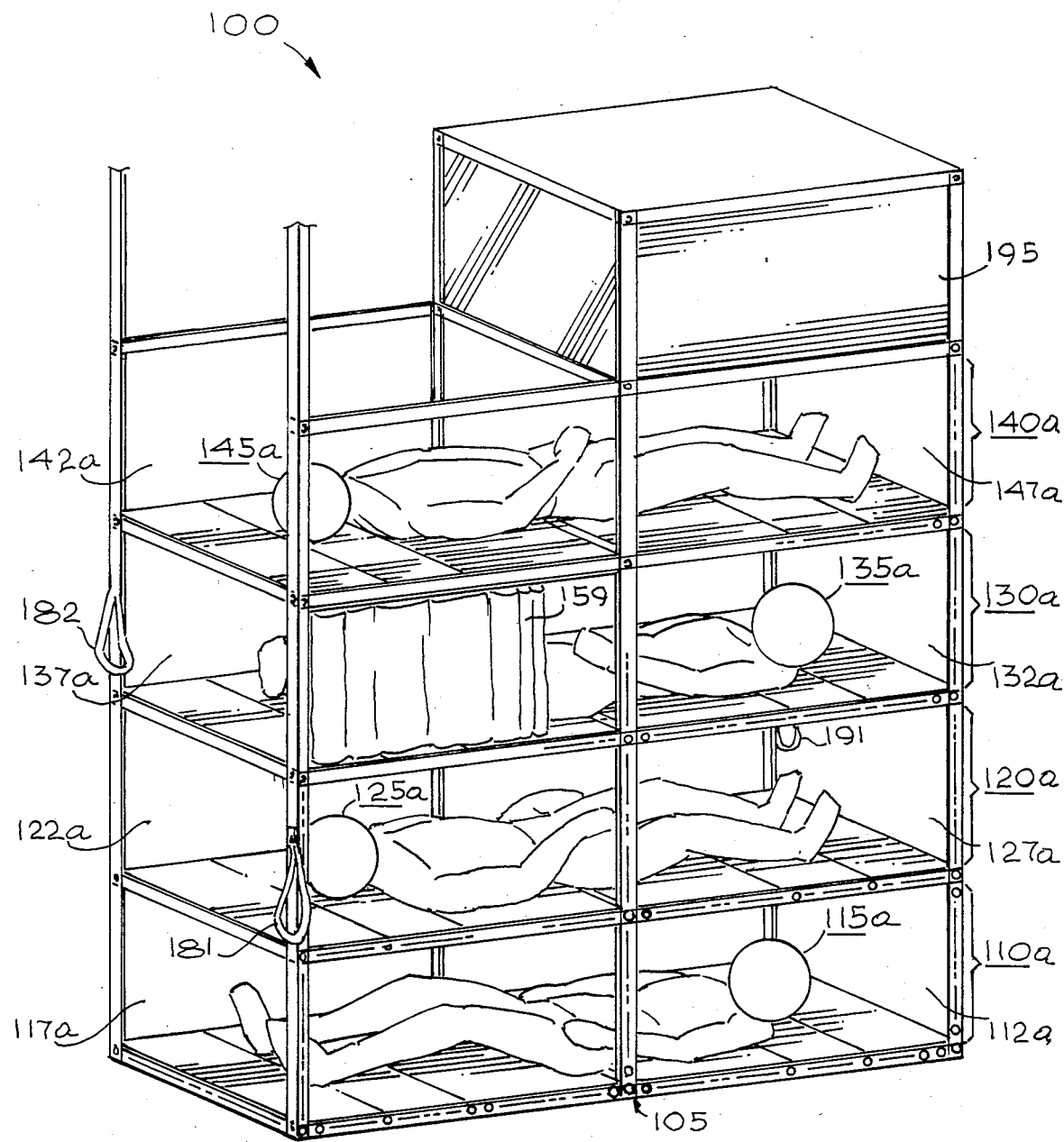
FIG. 1a is a schematic representation of the present invention with the structure operating in the bedding mode.
Figure 1B:
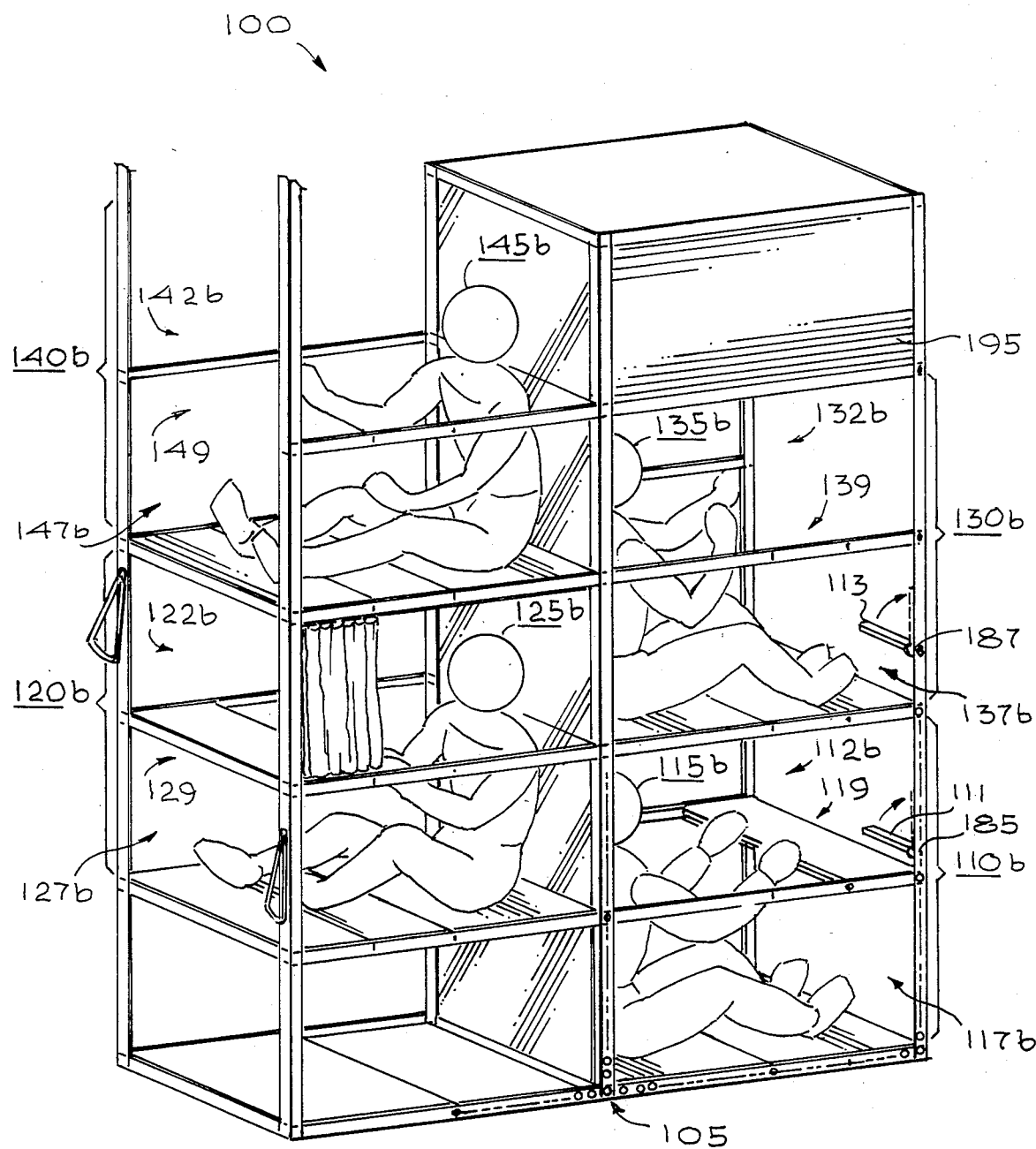
FIG. 1b is a schematic representation of the present invention with the structure converted to the seating mode.

Accommodations module 100 of FIGS. 1a and 1b entails a structural framework 105, approximately configured to fit the desired transportation vehicle, by means of which is defined a superposed plurality of reconfigurable accommodations compartments. For each of these compartments, framework 105 is constructed so as to convertibly support both the bedding configurations 110a, 120a, 130a and 140 of FIG. 1a and the corresponding seating configurations 110b, 120b, 130b and 140b of FIG. 1b. As is apparent from FIGS. 1a and 1b, the respective bedding and seating configurations are adapted to receive and support passengers 115, 125, 135 and 145 in respective generally-prone postures 115a, 125a, 135a and 145a and generally upright-seated postures 115b, 125b, 135b and 145b.

Further, in FIG. 1a, it is to be noted that the individual compartments more specifically include the respective framework-defined upper-torso sections 112a, 122a, 132a and 142a and companion framework-defined lower-torso sections 117a, 127a, 137a and 147a, respectively. These "a" section pairs associated with the bedding configuration are generally mutually-horizontally disposed. On the other hand, it can be seen from FIG. 1b that the "b" section pairs, (e.g. 112b and 117b; 132b and 137b) associated with the seating configuration are mutually-vertically disposed.

It may now be observed from FIGS. 1a and 1b that framework 105 is alterably constructed so that the lower-torso sections 127a, 137a and 147a of the respective compartments in their bedding configurations 120a, 130a and 140a, become upper-torso sections 112b, 122b and 132b of the respective compartments in their seating configurations 110b, 120b and 130b. Fourth, the framework construction is also such that the upper-torso sections 112a, 122a, 132a and 142a for the respective compartments in their bedding configurations 110a, 120a, 130a and 140a become the lower-torso sections 117b, 127b, 137b and 147b of the respective compartments in their seating configurations 110b, 120b, 130b and 140b.

Figure 2A:
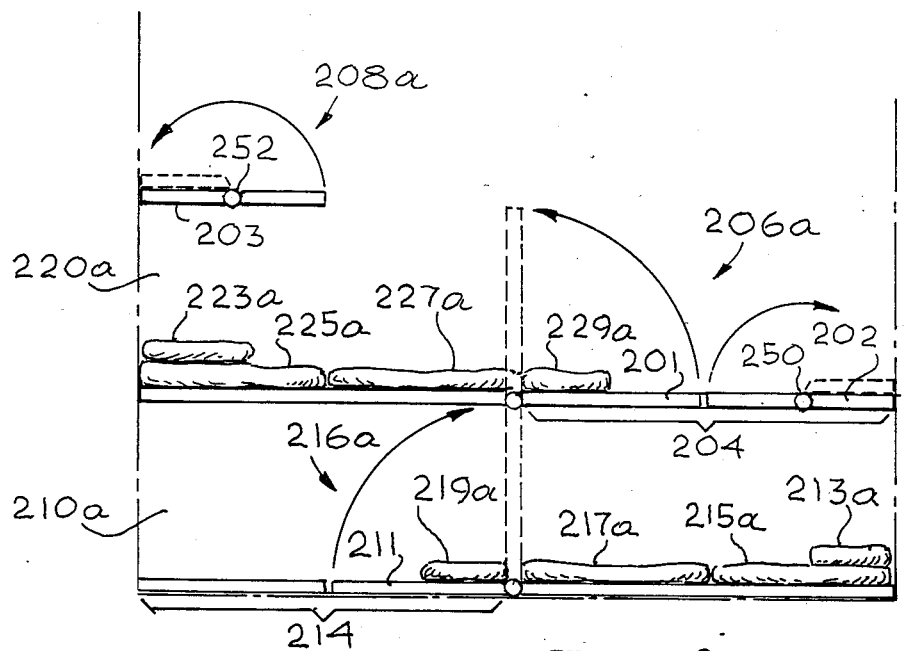
FIGS. 2a and 2b are schematic representations of a two-compartment unit according to the present invention, showing the various structural elements involved in the conversion of a compartment from the bedding mode to the seating mode.
Figure 2B:
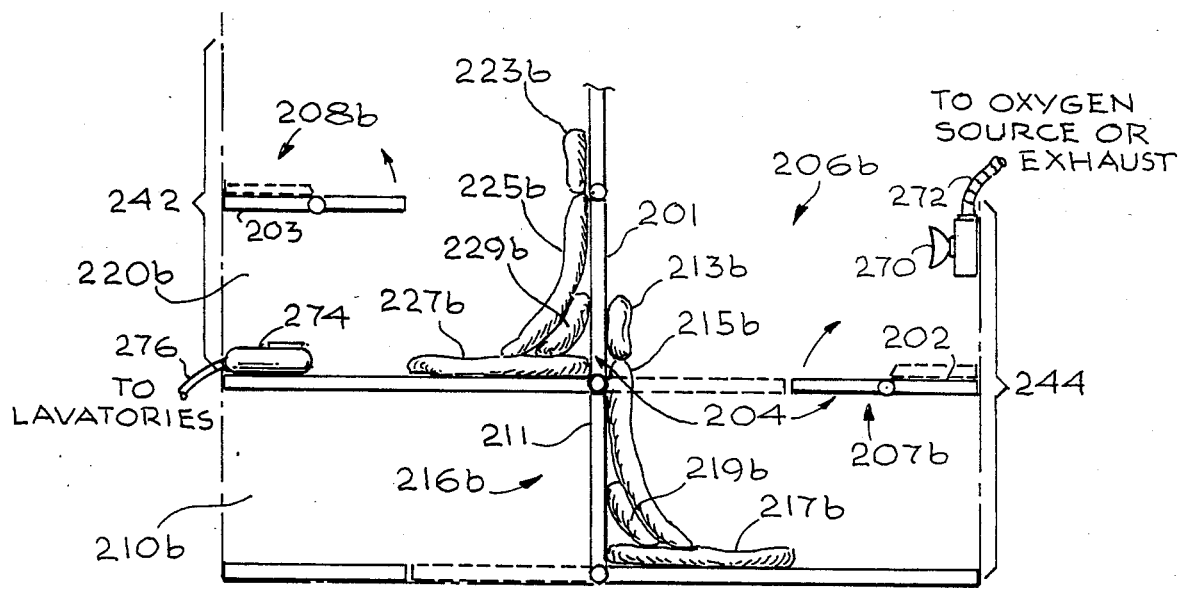

Although the invention has been discussed thus far in the context of the four-compartment module presented in FIGS. 1a and 1b, it will be apparent that a more fundamental unit, according to this invention, is a superposed two-compartment pair, such as the structures of FIGS. 2a and 2b. Although these units are more fundamental, they will for the present discussion be regarded as representative of a portion of the structure of framework 105 and will now be utilized as the basis for the description of a number of more specific aspects of the invention.

It becomes convenient to preliminarily label the illustrated compartments in terms of their mutual disposition. Compartment 210 will thus be designated the subjacent compartment while compartment 220 will be identified as the superjacent compartment. Furthermore, by analogy to the usage within FIGS. 1a and 1b, the "a" numerals in FIG. 2a will refer to various aspects of the associated bedding configurations, while the "b" numerals in FIG. 2b will be in terms of the associated seating configurations.

With regard then to FIGS. 2a and 2b, framework 105 from FIG. 1 includes an alterable surface-member 204 selectively positionable between the two dispositions 206a and 206b. Disposition 206a is a lower-torso support position for an accommodations subject or passenger within superjacent compartment 220a in the bedding configuration of FIG. 2a, while disposition 206b provides upper-torso clearance for an accommodations subject within subjacent compartment 210b in the seating configuration of FIG. 2b.

Although it will be apparent that the compartments in general and the alterable support surfaces in particular may be structured so as to allow for seating in various relative orientations, it will often be convenient to construct FIG. 1 framework 105 so that the FIG. 2b compartments in their seating configurations 210b and 220b define the illustrated back-to-back seating positions for accommodated subjects or passengers. One of the means by which such seating may be achieved is to more specifically design support-member 204 so as to include a first segment 201 which in member 204's subjacent clearance disposition of FIG. 2b becomes, as illustrated, both a lower-back support member for superjacent compartment 220b and an upper-back support member for subjacent compartment 210b. In an actual structure, the desired alterability may conveniently be realized by providing that segment 201 be pivotally supported for manually-displaceable movement between the respective horizontal and vertical dispositions of FIGS. 2a and 2b.

In the situation where subjacent compartment 210 is the "bottom" one of a superposed plurality of compartments, provisions for seating in a next-lower compartment become unnecessary. In this case, framework 105 may be made to include a subjacent surface member 214 having a segment 211 selectively positionable between the two dispositions 216a and 216b. Disposition 216a provides lower-torso support for a passenger within compartment 210a in the bedding configuration of FIG. 2a. Disposition 216b provides the passenger lower-back support in the compartment 210b seating configuration of FIG. 2b. As with segment 201, segment 211 may for convenience be pivotally supported in framework 105 for manually-displaceable movement between the respective horizontal and vertical dispositions of FIGS. 2a and 2b.

With respect once again to the general modular unit illustrated in FIGS. 2a and 2b, member 204 may also include a second segment 202 which in member 204's clearance disposition 206b of FIG. 2b, becomes an available utility-surface member disposed to be facing a passenger in seating compartment 240b. As a utility member of this nature, segment 202 becomes available to support food trays, writing implements and the like. It may be observed that segment 202 may be center-pivotally supported from pivot 250, for example, so as to be movable to an operating position 207b. Corresponding segment 203 in FIGS. 2a and 2b, supported pivotably from framework 105, illustrates the operating 208a and folded 208b dispositions available with this type of center-pivoting about pivot 252.

By analogy to the previously-mentioned configuration where, in FIG. 2a, subjacent compartment 210 is the "bottom" one of a superposed compartment plurality, superjacent compartment 220 may become a "top" compartment, in which case provisions for bedding in a next-higher compartment similarly become unnecessary. Upper segment 203 may then be arranged primarily as a utility-surface member without bedding-support functional requirements.

Another possible feature for segments 202 and 203 concerns access to and from the various compartments. Returning momentarily to FIG. 1b, framework 105 may be observed to be typically constructed so as to additionally define, for each of the respective compartments in their seating configurations, an entry section disposed opposite from the associated back-to-back seating position of the compartment. In FIG. 1b the entry sections appear as framework-defined ports 119, 129, 139 and 149, to which the ports 242 and 244 in FIG. 2b generally correspond. For the sake of facilitating compartment access through such ports, segments 202 and 203 may be constructed to temporarily snap off of their respective pivots 250, 252, to provide access clearance through the associated ports 244, 242, respectively.

As a supplemental matter, the compartments will usually be provided with suitable padding. Such padding will typically be structured so as to itself be convertible from bedding to seating functions. Compartments 210 and 220 are thus schematically shown to contain pillow and padding elements 213, 215, 217, 219, 223, 225, 227 and 229, with the "a" and "b" subdesignations again respectively referring to the bedding and seating configurations.

With regard furthermore to the issue of specific dimensions for the compartments, it will be apparent that such dimensions will tend to be an empirical function of such considerations as the stature of the expected passengers and the nature of the accommodations environment, e.g. wide-bodied aircraft or other vehicle; commercial or military. For example, compartment dimensions for paying passengers on-board a commercial aircraft may tend to be made more spacious than those for soldiers on-board a military transport.

For the sake of now formally relating the elemental two-compartment module of FIGS. 2a and 2b to the composite module of FIGS. 1a and 1b, framework 105 may be regarded as the means by which is established a superposed plurality of the subject two-compartment sets. The various compartments in a superposed plurality of this nature may for the additional sake of consistency with elemental-unit principles be regarded in successive-pair fashion with the superjacent compartment of any given set becoming the subjacent compartment in relation to an associated superjacently-disposed compartment.

Several supplemental considerations may now be noted. First is the matter of compartment access, especially for upper-level compartments. Toward this end, the previously-discussed compartment-access sections 119, 129, 139 and 149 defined by framework 105 are arranged to provide, as illustrated, a lateral access which is facilitated in the case of the upper compartments by stirrup-like footholds 181, 182 and 191. Such footholds enable passengers to climb to the entry section of the appropriate upper compartment. Alternatively, retractable stop members 111, 113 of FIG. 1b may be provided. They are spring-biased by springs 185, 187 to normally be out of the aisle. Of course, theoretically, the entire floor of the aisle could rise, elevator style, to permit passengers to reach their compartments.

Secondly, the nature of the upper-compartment configurations will often be such as to cause framework 105 to form an upper volumetric section 195 which typically is not directly utilized for bedding or seating. Section 195 thus becomes available for other purposes such as handbag and coat storage, a significant consideration in environments such as commercial aircraft.

Thirdly, a degree of privacy may be provided for the individual compartments by expedients such as curtains 139, slidably positionable across open faces of the framework.

Finally, it will be apparent that the conversion from bedding to seating will typically require a degree of cooperation and coordination between the occupants of the subject module. The conversion may conveniently be effectuated in a sequential manner by first converting the uppermost compartment from one mode to its other and then converting the remaining compartments in a successivly-subjacent fashion.

B. Transportation System

It will be apparent that the modules of the present invention may be employed in a variety of accommodations environments. One especially advantageous environment is that of passenger aircraft. The inventive nature of the subject high-density accommodations modules makes possible aircraft passenger transportation systems having load factors considerably in excess of those of the typical present-day systems.

A transportation system according to the present invention would thus include a transport vehicle having a passenger section and a plurality of passenger-accommodations modules appropriately adapted to be carried within this passenger section, where these modules would embody the inventive principles previously discussed.

Figure 3:
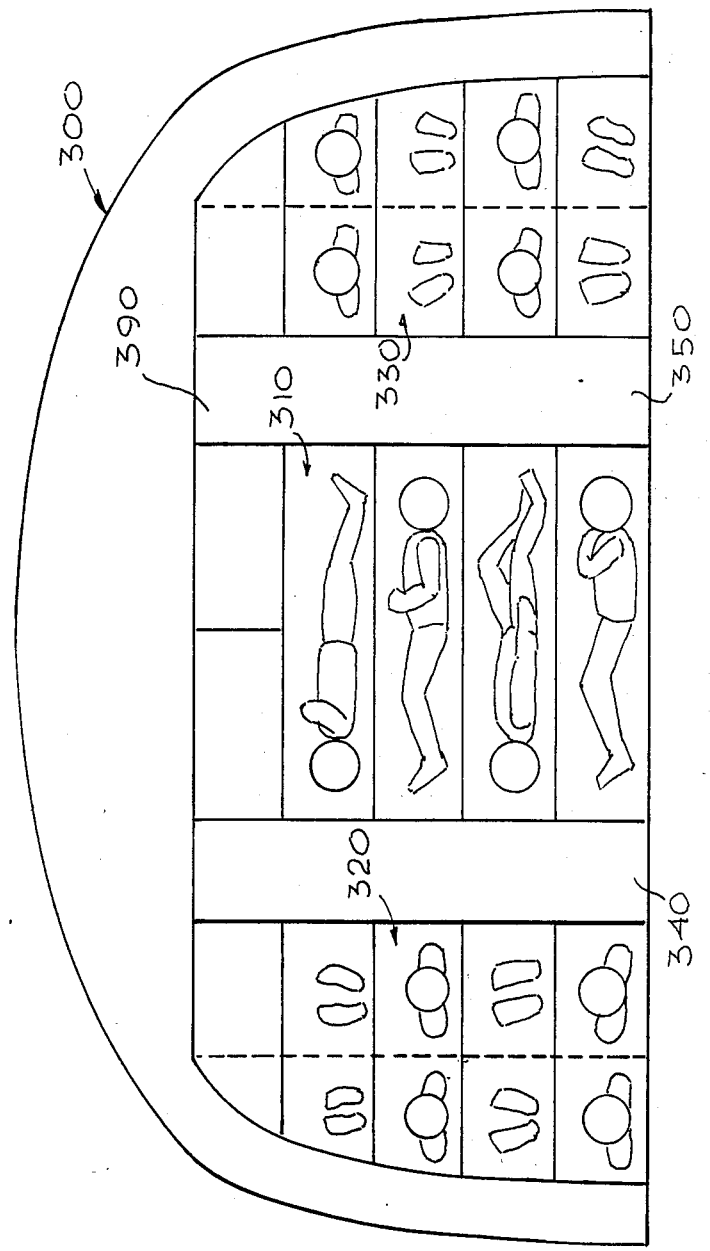
FIG. 3 is a schematic mechanical diagram showing the accommodations modules of this invention adapted to wide-bodied aircraft.

FIG. 3 shows an example schematically of an accommodations disposition for the case of a wide-bodied aircraft. The schematically illustrated sectional view through the passenger section 390 of aircraft body 300 shows a plurality of the subject modules in both transverse disposition 310 and paired-longitudinal dispositions 320 and 330, with sufficient space remaining for aisles 340 and 350. It will conjunctively be apparent that a great variety of structures and dispositions for such plural modules will be possible, with any particular configuration being an empirical function of the transporting vehicle's nature and construction.

As an actual numerical example of the potential increase in capacity for an aircraft such as a Boeing 747, consider the typical situation where a conventional economy-class seat occupies a width of 50 cm, a length space of 85 cm and, effectively, all of an available height H. For a typical height H of 250 cm within the passenger section, an accommodations module, according to this invention, could be provided with 50 cm of vertical space for each of four compartments in their bedding configurations, thus allowing 50 cm at the top of the module both for an upper-torso section of the top compartment's seating configuration and for the associated storage section. Further providing the module with 65 cm of width and 200 cm of length and utilizing a height H of 250 cm as a comparison standard, a general indication of relative capacities may be obtained by dividing the volume of an individual conventional seat by the volume of an individual compartment according to the invention:

$$\frac{50 \text{ cm} \times 85 \text{ cm} \times 250 \text{ cm}}{65 \text{ cm} \times 50 \text{ cm} \times 200 \text{ cm} \times 5/4} = 130\%$$

On an order-of-magnitude basis, therefore, the present invention creates the potential for an increase of at least 30% (and as high as 70%) in passenger capacity.

II. Construction Details

It will be apparent to those skilled in the art that given the inventive concepts set forth hereinbefore, actual implementations of the subject modules and systems may be realized by relatively straightforward, and typically empirical applications of conventional construction practices. A detailed discussion of such conventional construction practices has, therefore, been dispensed with.

III. Ancillary Advantages and Considerations.

It should be noted that there are some unobvious inherent advantages in the configurations which I have described in this application and in my earlier-filed Disclosure Documents Ser. Nos. 128, 421 (June 18, 1984) and 128, 880 (July 5, 1984), both entitled "Seat-Bed System in Aviation."

One of those advantages is that a potential hijacker would find the structure I have invented a very uninviting environment and no hijackings would be undertaken. If a hijacking began, the hijacker would be a "sitting duck" in the aisle between the accommodations I have invented.

Each compartment would be provided with communications to a central board. The usual reading lights, attendant calling facilities and air-conditioning would be provided.

In connection with smoking in the individual compartments, the oxygen system masks 270 and conduits 272 (FIG. 2b) would, except during a depressurization incident, be operated as a smoke-exhaust system with appropriate exhaust pumps to remove the smoke from the accommodations. The smoking passengers would be required to exhale into the mask and to hold the cigarette in the ashtray which would be coupled to the exhaust system, when the cigarette was not between the lips of the smoker. Appropriate filters would be provided to keep ashes out of the air conduits.

As for toilet facilities in the compartments, it is contemplated that individual miniature commodes 274 with vacuum exhaust facilities 276 coupled to the main airplane lavatories (not shown), would be provided, for urination only.

If the widths of the seat beds are reduced to 50 cm, there can be a 70% increase in accommodation capacity over what is now realized in commercial aircraft.

IV. Claims

The preceding description has presented in detail exemplary preferred ways in which the concepts of the present invention may be applied. Those skilled in the art will recognize that numerous alternatives encompassing many variations may readily be employed without departing from the spirit and scope of the invention as set forth in the appended claims, in which:

What is claimed is:

1. An accommodations module comprising:
   (A) means defining at least one paired set of reconfigurable accommodations compartments, the members of each such set being mutually disposed as a superjacent compartment and a subjacent compartment;
   (B) said means convertibly establishing, in relation to each of said compartments, a bedding configuration and a seating configuration, said respective configurations being adapted to receive and support an accommodations subject in respective generally-prone and generally upright-seated postures;
   (C) each of said compartments having, for each associated configuration, a means-defined upper-torso section and a means-defined lower-torso section, where:
      (1) the two sections of each compartment are generally horizontally-disposed in said bedding configuration and generally vertically disposed in said seating configuration; and,
      (2) said means is constructed such that:
         (a) the lower-torso section of said superjacent compartment in its bedding configuration becomes an upper-torso section for said subjacent compartment in its seating configuration; and,
         (b) the respective upper-torso sections for said bedding configurations become lower-torso sections for said seating configurations;
   said means including an alterable support-member selectively positionable between:
      (1) a lower-torso support disposition for said superjacent compartment in its bedding configuration; and,
      (2) an upper-torso clearance disposition for said subjacent compartment in its seating configuration;
   said means being constructed such that said compartments in their seating configurations define back-to-back seating positions for accommodations subjects;
   said alterable support-member including a first segment which, in said member's subjacent clearance disposition, becomes both a lower-back support member for said superjacent compartment and an upper-back support member for said subjacent compartment.

2. A module according to claim 1 in which:
   said first segment is adapted for pivotal positionability between said lower and upper-torso dispositions.

3. A module according to claim 1 in which:
   said means includes a subjacent support-member having a segment selectively positionable between
      (1) a lower-torso support disposition for said subjacent compartment in its bedding configuration and
      (2) a lower-back support disposition for said subjacent compartment in its seating configuration.

4. A module according to claim 3 in which:
   said subjacent segment is adapted for pivotal positionability between said lower-torso and lower-back dispositions.

5. An accommodations module comprising:
   (A) means defining at least one paired set of reconfigurable accommodations compartments, the members of each such set being mutually disposed as a superjacent compartment and a subjacent compartment;
   (B) said means convertibly establishing, in relation to each of said compartments, a bedding configuration and a seating configuration, said respective configurations being adapted to receive and support an accommodations subject in respective generally-prone and generally upright-seated postures;
   (C) each of said compartments having, for each associated configuration, a means-defined upper-torso section and a means defined lower-torso section, where:
      (1) the two sections of each compartment are generally horizontally-disposed in said bedding configuration and generally vertically disposed in said seating configuration, and
      (2) said means is constructed such that:
         (a) the lower-torso section of said superjacent compartment in its bedding configuration becomes an upper-torso section for said subjacent compartment in its seating configuration; and,
         (b) the respective upper-torso sections for said bedding configurations become lower-torso sections for said seating configurations;
   said means including an alterable support-member selectively positionable between:
      (1) a lower-torso support disposition for said superjacent compartment in its bedding configuration, and
      (2) an upper torso clearance disposition for said subjacent compartment in its seating configuration;
   said means being constructed so that said compartments in their seating configurations define back-to-back seating positions for accommodations subjects;
   said alterable support-member including a second segment which, in said member's subjacent clearance disposition, becomes an available utility-surface member disposed to be facing an accommodations subject seated in said subjacent compartment.

6. A module according to claim 5 in which:
   (A) said means is constructed so as to further define, for each of the respective compartments in their seating configurations, an entry section disposed opposite from the associated back-to-back seating position; and
   (B) said utility member is constructed to be alterably positionable so as to provide access clearance through the associated entry section.

7. A module according to claim 6 in which:
   (A) said means includes an upper utility-surface member disposed to be facing an accommodations subject seated in said subjacent compartment;
   (B) said upper member is constructed to be selectively removable so as to provide access clearance through the associated entry section.

* * * * *